Patented Apr. 1, 1941

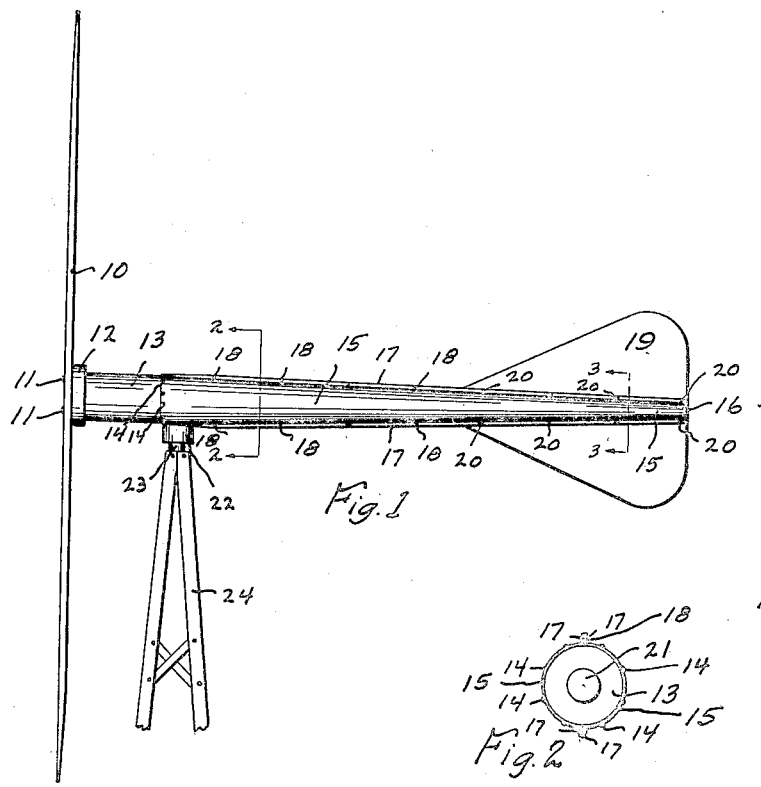

2,236,510

UNITED STATES PATENT OFFICE 2,236,510

STREAMLINE HOUSING AND VANE SUPPORT FOR WIND DRIVEN ELECTRIC UNITS

John R. Albers, Sioux City, Iowa, assignor to Wincharger Corporation, Sioux City, Iowa, a corporation of Minnesota Application June 15, 1939, Serial No. 279,323

5 Claims. (Cl. 290—55)

My invention relates to a wind driven electric unit.

An object of my invention is to provide an attachment in those types of wind electric units wherein a tail vane is used to keep the machine into the wind.

A further object of my invention is to eliminate the use of weakened tail vane supporting structures.

A further object of my invention is to provide a vane support which although being stronger in construction, is nevertheless of lighter weight and presents a more symmetrical appearance.

A further object of my invention is to provide a method for attachment to the tail vane itself which method strengthens the vane.

A further object of my invention is to provide a structure which besides acting in the above capacities will also serve as a housing at the rear end of an electric generator, with auxiliary means for hinging the housing so that it can be swung to open position in order to manipulate certain members at the rear of the generator such as collector rings, bearings, oiling devices, etc.

A further object of my invention is to provide a device which is simple in construction and can be manufactured at a reasonable cost.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of the housing and vane support,

Figure 2 is a sectional view taken along the lines 2—2 of Figure 1,

Figure 3 is a sectional view taken along the lines 3—3 of Figure 1,

Figure 4 is a slight modification, and

Figure 5 is a fragmentary view of Figure 4 showing the open position of the arrangement.

I have used the character 10 to designate a propeller blade which is attached at 11 to a suitable brake or other housing 12. The shaft of the propeller 10 is attached to a rotor of the electric generator 13. Attached at 14 peripherally about the rear of the generator 13 is the substantially conical shaped hollow member 15 which extends rearwardly to the reduced diameter portion 16. A pair of integral flanges 17 are formed together with substantially semi-circular portions of the member 15 which flanges are attached suitably at spaced intervals at 18.

The member 15 is then formed by two semi-conical portions having exterior flanges, although if desired such flanges are not essential. The tail vane of the arrangement which is indicated by the character 19 is placed between the two portions 15 and riveted or otherwise attached at 20 which arrangement is shown more clearly in Figure 3. Figure 2 illustrates a section taken along the lines 2—2 of Figure 1 showing attachment to the rear of a generator and wherein the generator rear bearing is indicated by the character 21.

Various other attachments such as the supporting member 22, the turntable pivot 23 and the tower 24 are shown in Figure 1.

It will now be seen from the foregoing that the members 15 can be made of very light gauge material and yet be of maximum strength due to the arch principles involved, thereby dispensing with the necessity of using angle irons or pipes or other similar structures which will allow distortion or bending of the tail vane structure. Also the members 15 provide the additional advantage of complete protection rearwardly of the generator since this portion is completely enclosed.

The bracing structure at the tail vane 19 also prevents twisting of the tail vane in any direction either laterally or radially from the axis of the unit since the semi-circular arches 15 will provide maximum strength against these stresses. The flanges 17 together with the balance of the structure also serve to provide additional means together with the tail vane to keep the blade into the wind.

A slightly modified form of the invention is shown in Figure 4 wherein all of the characteristics as above described are substantially the same with the exception, however, that a pair of pivoting bolts are provided at 25 which are pivoted to an extension 26 which extension is formed integrally with the generator casing 13. The units 15 are thus pivoted at 25 and tapped holes can be provided at 27 within the generator 13 to coincide with further openings 28 in the shell 15. A pair of wing nuts 29 are inserted through the openings 28 and within the openings 27 so that the unit in normal operating position will appear as in Figure 4 thereby providing all of the advantages as above described.

Quite frequently certain members which function cooperatively with the generator or the turntable are positioned directly at the rear of the generator and it is desirable to protect such members. For instance, as shown in Figure 5 the turntable pin is indicated by the character 30 which is received within the cylindrical member 31. When it is necessary to oil the pin 29 or for other reasons, the wing nuts 29 are removed and the entire section 15 is pivoted downwardly about the bolts 25 as shown in Figure 5. This, then, allows convenient access to the member 30. After the attention is given the arrangement is closed as described.

It will be understood, of course, that other arrangements such as commutators, collector rings, etc., can also be housed in the above manner. A lower portion of the cylindrical member 15 such as at 32 can be cut away and the side members at this portion spread apart suitably a slight distance to allow pivoting as shown in Figure 5.

It will now be seen that I have provided a combined streamline housing and vane support for wind electric units which provides a symmetrical appearance, which can be attached directly to the rear of a generator, which is of maximum strength for a minimum weight, which provides complete streamline effects, which assists in the vane action, which serves as a protecting housing for rear generator members of any type and which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A housing and vane support for wind driven electric units comprising a rearwardly extending conical member having its base portion attached peripherally about a generator rear end, said conical member converging rearwardly, a tail vane attached at the rear portion thereof, means for hingedly attaching said conical structure adjacent to said generator rear for causing pivoting of the same with respect to said generator.

2. A housing and vane support for wind driven electric units comprising a pair of substantially semi-conical members attached along the edges thereof, said members being attached peripherally about a generator rear end, a tail vane attached between said members and at the rear thereof.

3. A housing and vane support for wind driven electric units comprising a pair of substantially semi-conical members attached along the edges thereof, said members being attached peripherally about a generator rear end, a tail vane attached between said members and at the rear thereof, means for pivoting said members adjacent to said generator for causing opening of the same with respect to the rear thereof, and means for locking the members in normal operative position in line with the generator.

4. A housing and vane support for wind driven electric units comprising a pair of substantially semi-conical members attached along the edges thereof, said members being attached peripherally about a generator rear end, a tail vane attached between said members and at the rear thereof, said members having joined marginal flanges for providing additional vane effect for the unit.

5. In combination with a wind electric generator, a tail vane support comprising a rearwardly extending frusto-conical member having its largest diameter portion attached peripherally to a generator rear, and having a tail vane attached to the smaller diameter portion thereof, said generator having a rearwardly extending portion, means for pivoting said frusto-conical member to said portion and means for locking the same in direct line with said generator when in operative position.

JOHN R. ALBERS.